(12) United States Patent
Rosecrans

(10) Patent No.: US 9,795,251 B2
(45) Date of Patent: Oct. 24, 2017

(54) DETACHABLE EXTERNAL HEATING DEVICE FOR AN OUTDOOR GRILL OR SMOKER

(71) Applicant: Joshua Rosecrans, Dunwoody, GA (US)

(72) Inventor: Joshua Rosecrans, Dunwoody, GA (US)

( * ) Notice: Subject to any disclaimer, the term of this patent is extended or adjusted under 35 U.S.C. 154(b) by 345 days.

(21) Appl. No.: 14/748,596

(22) Filed: Jun. 24, 2015

(65) Prior Publication Data

US 2016/0374511 A1    Dec. 29, 2016

(51) Int. Cl.
    *A47J 37/07*    (2006.01)

(52) U.S. Cl.
    CPC .... *A47J 37/0786* (2013.01); *A47J 2037/0795* (2013.01)

(58) Field of Classification Search
    CPC .......... A47J 37/0786; A47J 2037/0795; A47G 23/02; F24C 15/10; B01L 9/04
    See application file for complete search history.

(56) References Cited

U.S. PATENT DOCUMENTS

| | | | |
|---|---|---|---|
| 4,126,120 A | 11/1978 | Bourboulis | |
| 4,305,559 A | 12/1981 | Jackson | |
| 4,337,752 A | 7/1982 | Leounes | |
| 4,832,295 A | 5/1989 | Wagner | |
| 6,196,212 B1 | 3/2001 | Taplan et al. | |
| 6,470,879 B1 | 10/2002 | Taplan | |
| 7,650,882 B2 | 1/2010 | Little et al. | |
| 7,661,421 B1 | 2/2010 | Lustig et al. | |
| 2011/0290231 A1 | 12/2011 | Padgett | |

*Primary Examiner* — Alfred Basichas
(74) *Attorney, Agent, or Firm* — J. T. Hollin Attorney at Law, P.C.

(57) ABSTRACT

Disclosed is a grid-like device for the support of the bottom exterior surface of a cooking vessel, the grid being removably placed atop the upper exterior surface of an outdoor cooking grill or smoker. Three identically-shaped and symmetrically bent metal rectangular bands are conjoined at their midpoints to form essentially a spherical grid shape. A series of symmetrical bends, arcs, and rounds are formed at specific intervals transverse to the length of each band such that the cumulative shape of the adjoined bands forms the grid. The bottom-most segment of the support grid comprises legs and feet of a semi-rigid elasticity such that the support device may be flexibly placed about the top of the grill or smoker. Spring tension coils connect the inner surfaces of the bands to stabilize the grid shape and to impart leveraged gripping force upon the feet of the grid.

3 Claims, 4 Drawing Sheets

DETACHABLE EXTERNAL HEATING DEVICE FOR AN OUTDOOR GRILL OR SMOKER

CROSS-REFERENCES TO RELATED APPLICATIONS

Not applicable

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND OF THE INVENTION (1) Field of the Invention

The inventive concept disclosed is, in a very general sense, related to different embodiments of cooking apparatuses that are used for supporting a single pot or cooking utensil directly atop a heat source. For instance, typical gas or electric cooktop grates have been designed to support small and large pots that span the entire area above a burner on the cooktop. However, in a completely different application of such mechanisms, the inventive concept described herein is concerned with a mechanism for the support of pots, and other containers of foodstuffs directly above an outdoor cooking grill or smoker.

(2) Description of the Related Art, Including Information Disclosed Under 37 CFR 1.97 and 1.98

The following materials present inventive concepts that feature devices designed to perform cooking functions related to the general area of the disclosure herein.

US Published Patent Application #2011/0290231 (Dec. 1, 2011) A gas burner includes a burner body and a simmer plate assembly. The burner body includes a central cavity in which at least one flame is provided. The simmer plate assembly includes a plate portion and a base portion configured to support the plate portion. The assembly is configured to be at least partially and removably inserted into the central cavity. The plate portion is configured to act as a barrier between the at least one flame and a heated object placed above the gas burner.

U.S. Pat. No. 7,650,882 (Jan. 26, 2010) A pot support for a ceramic glass cooktop having integrally formed grates. The pot support is formed of a material able to withstand gas cooking temperatures without substantial alteration of its shape or composition. The pot support is configured to rest in a stable position over a gas burner head to support a relatively small diameter utensil centered over the burner head and to cooperate with the integrally formed grate to support large or small diameter utensils that are supported over the burner off-center relative to the grate.

U.S. Pat. No. 7,661,421 (Feb. 16, 2010) A wok support ring supports the weight of a wok and food items to be cooked in the wok and imparts a rocking motion to the wok as it is moved in a back and forth motion by the worker. A wok rocking device includes the use of a wok support base which moves in a rocking motion via cam tracks with roller followers. When the worker pulls the wok in a back and forth motion, the rollers follow the cam track to cause the wok to rise rapidly and then rock forward near the end of the stroke. A wok rocking device also can utilize movable linkages attached to a wok support base in order to create the rocking motion needed to mix and fold the food items within the wok.

U.S. Pat. No. 6,470,879 (Oct. 29, 2002) The cooking apparatus includes a glass-ceramic panel (1), which has at least one cooking area; a gas burner (3) providing an open flame (3); a cooking vessel support (5) including feet (5b) and a resting surface for a cooking vessel (6) placed on the cooking vessel support (5); and a device for holding the cooking vessel support (5) mechanically fixed and centered over the gas burner (3) including a foot holding device for holding the cooking vessel support (5). The foot holding device includes foot holders (7) for the respective feet, which are preferably formed by depressed or raised regions in the glass-ceramic panel or foot holder parts attached to it.

U.S. Pat. No. 6,196,212 (Mar. 6, 2001) The cooking apparatus includes a glass or glass-ceramic plate (1) providing a cooking surface with a cooking area and provided with a through-going opening (2) in the cooking area; a gas burner (3, 19, 21) arranged in or under the throughgoing opening (2) in the glass or glass-ceramic plate (1), which has a burner ring (3b) for supporting an open flame (3a, 19a, 21a); a cooking vessel support (5,5a) arranged on the glass or glass-ceramic plate over the through-going opening (2) which has a resting surface for a cooking vessel (6) and a device for supplying a mixture of combustible gas and primary air to the burner ring (3b) to form the open flame, whereby substantially all of the secondary air is drawn from a chamber or space under the glass or glass-ceramic plate (1).

U.S. Pat. No. 4,832,295 (May 23, 1989) A fondue stand having four vertically upstanding partition walls defining upper edge surfaces upon which is supported a fondue pot. The vertical partition walls are angularly spaced apart on a main supporting frame such that, when the fondue pot is supported on the upper edge surfaces, the partition walls lie in vertical planes offset from, or at an angle to, the vertical planes containing the diameters of the circular cross section of the fondue pot. In an alternative embodiment, a security ring for a stove range is provided, with the main body portion being circular and having a central cutout from which extends a hollow central hub insertable into the circular opening of the range of the stove, for supporting pots and pans in a safe manner on the range.

U.S. Pat. No. 4,337,752 (Jul. 6, 1982) A collar-like device for reducing lateral heat dissipation from range top heating elements during cooking operations. An integrally-formed annular collar means of generally frusto-conical configuration is adapted to rest atop a range, in surrounding relation to a heating element disposed on said range top. A generally toroidally-shaped pocket of heated air surrounds an item of cookware adjacent its lower portion when such cookware is slideably received within the opening of the collar-like device surrounding the element. A first alternative embodiment has a hollow collar so that a dead air space interiorly of the collar-like device provides an additional thermal barrier. A second alternative embodiment provides a plurality of successively smaller nesting collars to accommodate cookware of differing sizes.

U.S. Pat. No. 4,305,559 (Dec. 15, 1981) The present invention is a round-bottom flask support which comprises a base of honeycomb or honeycomb-like material flat on its lower surface and having a concave upper surface substantially complementary to the flask it is designed to support. The cross section of the base is preferably cylindrical and a cylindrical annular ring engaging the periphery of the base and upper surface can be provided for added dimension stability. The upper surface of the base preferably has a semi-spherical configuration produced by compression of the upper surface of the base toward the lower surface to create "pleats" in at least some cell walls. This provides an added mechanical lock at the cell nodes which reduces the tendency of the honeycomb to separate at the cell nodes and is of particular advantage where the honeycomb is subjected to high temperatures and the adhesive bond may be weakened. The honeycomb base is usually aligned so that the cells extend transversely to the lower surface of the base and at least some cells usually communicate between the lower surface and the upper surface of the base.

U.S. Pat. No. 4,126,120 (Nov. 21, 1978; Bourboulis) Apparatus for distributing heat from a heat source relatively evenly over the bottom of a vessel to be heated is disclosed. A first annular element is provided which includes an upwardly concave dish-shaped annulus circumscribing a hollow center. A releasable connecting element of a first type is located on the underside of the first annular element. A second annular element includes an upwardly concave dish-shaped annulus which is larger than the annulus of the first annular element. A releasable connecting element of a second type complementary to the first type is located on the inner periphery of the annulus of the second annular element so that the elements can be locked together for use and disassembled for cleaning.

BRIEF SUMMARY OF THE INVENTION

The device disclosed is essentially a support means for a pot or other cooking vessel, the device being removably affixed to the upper portion of an outdoor cooking grill or smoker. The support device is formed form preferably aluminum or other material having similar physical characteristics. The support device is configured by joining three identically-shaped rectangular bands at a common junction corresponding to the midpoint of each of the three bands. A series of symmetrical bends are placed at specific intervals along the length of each band such that the cumulative shape of the adjoined bands forms a virtually spherical grid. An arrangement of spring tension coils joins diametrically-opposed rectangular bands to each other. The bands, by forming the spherical shape, and the spring tension coils, enable a balanced, stable grip of the support grid atop an outdoor cooking grill or smoker.

The bottom-most segment of the support device comprises six "feet" emanating from each end of the three bands, the feet being of a semi-rigid elasticity such that the support device may be affixed to the top of the outdoor grill. The support device is further able to withstand cooking temperatures commonly encountered in the use of outdoor grills or smokers. The support device is configured to rest in a stable position centered over the top or smokestack of the outdoor grill. The support device can thereby accommodate a relatively small diameter pot or cooking utensil centered over the top of the outdoor grill.

DETAILED DESCRIPTION OF THE INVENTION

The objects, features, and advantages of the concept presented in this application are more readily understood when referring to the accompanying drawings. The drawings, totaling five figures, show the basic components and functions of embodiments and/or methods of use. In the several figures, like reference numbers are used in each figure to correspond to the same component as may be depicted in other figures.

Figure 1:
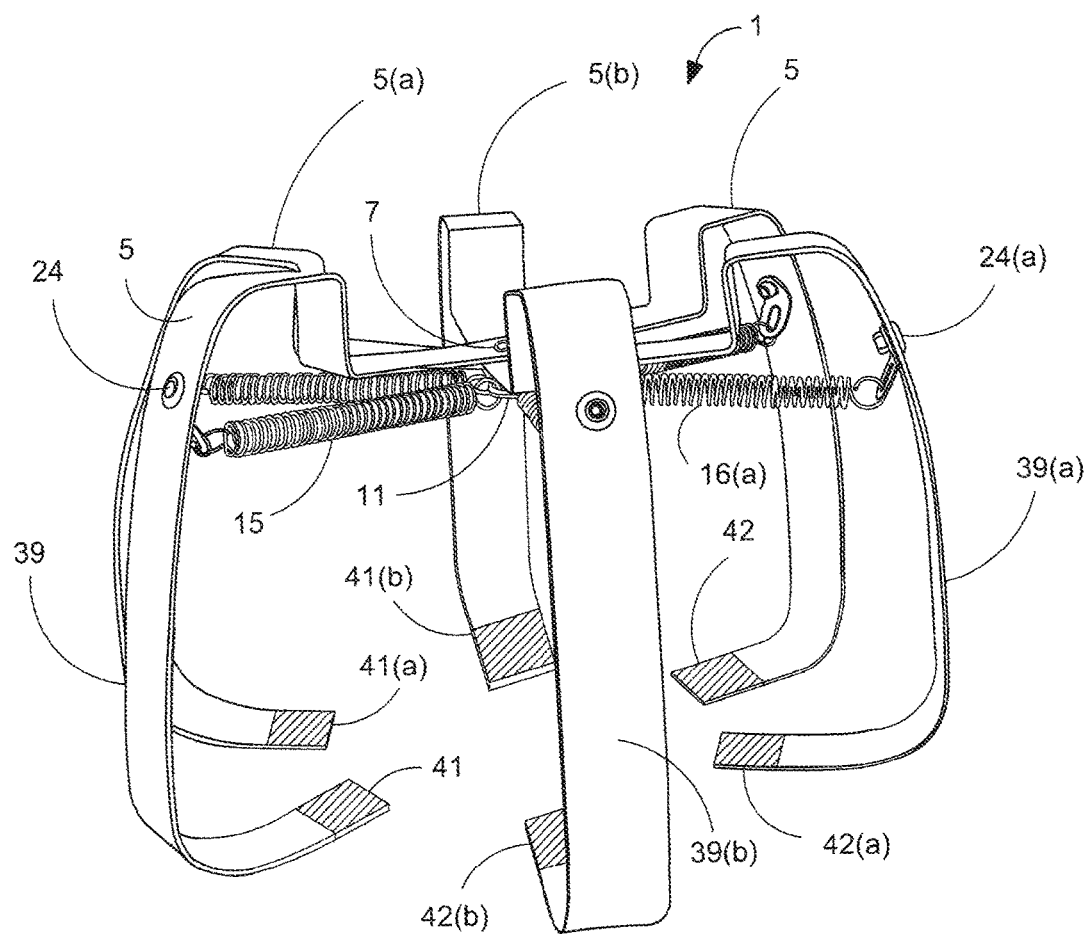
FIG. 1 is a three-dimensional view of the support grid 1 showing an assemblage of three symmetrically-bent metallic bands.

The discussion of the present inventive concept will be initiated with FIG. 1, which illustrates the support grid 1 in the configuration as a finished product which would be used by a consumer.

The disclosed support grid 1 comprises three identical, primarily longitudinal, conjoined metallic bands, being a first band 5, a second band 5(a), and a third band 5(b). The three bands 5, 5(a), 5(b) are composed of a semi-rigid material, enabling a flexing of each of the bands 5, 5(a), 5(b) as may be desired by a user to. A general perspective view of the inventive concept in its intended utilization is depicted in FIG. 1. In the various drawing figures disclosed, all three bands 5(a), 5(b), 5(c) have identical components, configurations and dimensions. Therefore, these identical items for the second and third bands 5(a), 5(b) will be further distinguished by attachment of the sub-letter (a) or (b), respectively, to the components of the second and third bands 5(a), 5(b).

Figure 5:
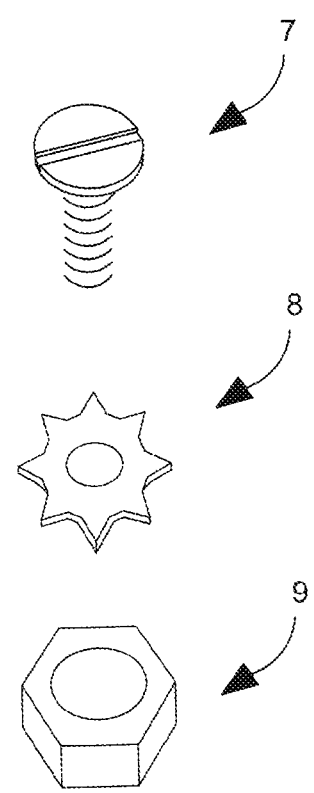
FIG. 5 illustrates, from top to bottom, a center bolt 7, a center locking washer 8, and a center nut 9, each of these three components used to conjointly attach all three bands 5, 5(a), 5(b), through their respective center apertures.

To form the support grid 1, all three bands 5, 5(a), 5(b) are conjoined at their respective center apertures 6, 6(a). 6(b) (not visible in FIG. 1) by any of a variety of fastening means. In the preferred embodiment, a bolt 7, a corresponding lock washer 8, and nut 9 (collectively shown in FIG. 5) are used to conjointly fasten each of the three bands 5, 5(a), 5(b) through their respective apertures 6, 6(a), 6(b) located at the midpoint of each band 5, 5(a), 5(b). By viewing FIG. 1, it can be seen that a systematic and symmetrical bending of the three bands 5, 5(a), 5(b) results in the formation of six relatively vertical legs culminating in six diametrically opposed boots 41-42, 41(a)-42(a), and 41(b)-42(b).

The fastening means is tightened securely, yet still allowing restricted freedom of rotation of the three bands 5, 5(a), 5(b) about the axis of the bolt 7. The support grid 1, in its intended use, is most stable and effective by a user symmetrically spreading the three bands 5, 5(a), and 5(b) radially with respect to the axis of the bolt 7. In this manner, each of the bands 5, 5(a), 5(b) is oriented, from one to the other, by a separation angle of approximately sixty (60) degrees. This enables the six relatively horizontally opposed boots 41-42, 41(a)-42(a), and 41(b)-42(b) of each of the three bands 5, 5(a), and 5(b) to be placed atop a cooking grill or smoker in a stable and laterally balanced manner.

Figure 2:
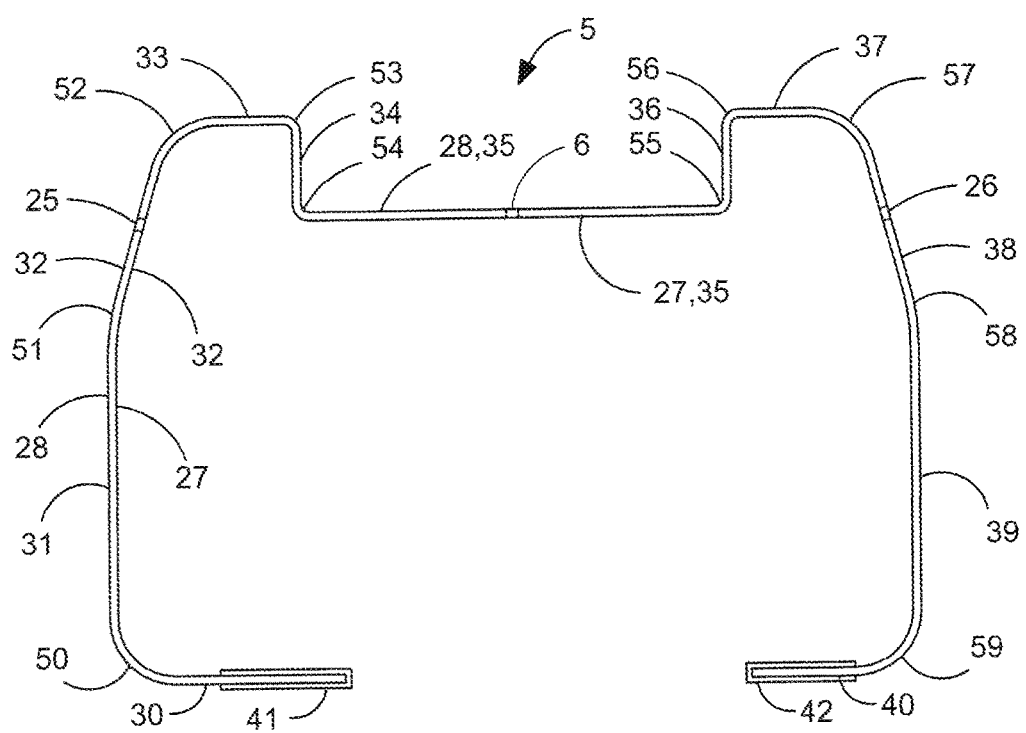
FIG. 2 is a profile view common to each of the three bands which comprise the support grid, in particular is shown the first band 5, and further showing the pattern of bends, arcs, rounds, and linear segments

For better clarification of the profile and configuration of each of the three bands 5, 5(a), 5(b), a profile view of the first band 5 is shown in FIG. 2. The profile of the first band 5 is identical to the profiles of the second and third bands 5(a), 5(b). In FIG. 2 there is shown a sequence of varying bends, arcs, and rounds (50-59) made orthogonally transverse to the first band 5, which all emanate from, or transform into, linear sections (30-40) of the first band 5. As can be seen, the first band 5 is symmetrical with respect to the left side in comparison to right side of the first band 5.

In the preferred embodiment, the general dimensions of each band 5, 5(a), and 5(b) prior to the symmetrical transverse bending along the length of the bands 5, 5(a), 5(b), comprise 25.0 inches in length, 1.0 inch in width, and 0.125 inch thick. The boots 41-42, 41(a)-42(a), and 41(b)-42(b) are approximately 1.00 to 1.25 inch in length. These dimensions may be varied in accordance with the type and size of outdoor grill or smoker upon which the support grid 1 will be affixed. When each band 5, 5(a), 5(b) has undergone the symmetrical bending, the resulting support grid 1 has general dimensions of 9.25 inches from left to right and 6.25 inches from top to bottom. The symmetrical bending of the bands 5, 5(a), 5(b) thereby forms an inner surface 27 of each band composing the support grid 1.

Again referring to FIG. 2, a description of the first band 5 will be conducted in a clockwise manner, initiated at the bottom left section of the first band 5. A horizontally-oriented segment, termed the "left foot" 30 is the starting point. Continuing to the left of the left foot 30, an arcuate, ninety-degree bend forms a "left heel" 50 of the band 5, which then transcends upwardly to form a relatively straight segment comprising a "left leg" 31 of the band 5. From this point, proceeding upward, a slight bend, termed a "left mid-bend" 51 of approximately ten degrees occurs, which then transforms into a linear segment termed a "left incline" 32.

Next, in FIG. 2, there appears an arcuate bend of approximately eighty degrees, entitled a "left inward arc" 52 which transforms into a horizontal "left flat" 33 section, measuring approximately 1.0 inch in the preferred embodiment. Immediately after the left flat 33 occurs a "left outer round" 53, comprising a ninety degree bend, and forming a vertical segment, termed a "left brace" 34. Following the left brace 34 is a "left inner round" 54 of ninety degrees resulting in a horizontal segment referred to as a "top surface" 35.

The top surface 35 features a center aperture 6 (integral to all three bands 5, 5(a), 5(b)), through which a type of fastener may be inserted to join all three bands at a common point. The preferred means of fastening comprises a bolt 7, fastened by a corresponding lock washer 7 and nut 9 (all shown in FIG. 5). The top surface 35 extends rightward and the bends and linear segments previously described occur in the reverse order on the right side of the center aperture 6. From the center aperture 6, the sequential description of the first band 5 continues clockwise, with a right inner round 55, a right brace 36, a right outer round 56, a right flat 37, a right inward arc 57, a right incline 38, a right mid-bend 58, a right leg 39, a right heel 59, and a right foot 40.

It is to be noted that the left foot 30 and the right foot 40 are respectively covered by a boot 41 and 42, respectively. During the manufacturing process, the boots 41, 42 are constructed of elastomeric material. This elastomeric material is formed from a process comprising a coating of a plastic dip-type substance which securely adheres to each foot 30, 40 for a length of approximately 1.0 inch of each foot 30, 40.

Further details essential in the description of the first band 5, include a left side aperture 25, drilled through the left incline 32, and a right side aperture 26 drilled through the right incline 38. Each of these apertures 25, 26 on opposite sides of the band 5 serve to facilitate the fastening of a rigid left tab 18 and a rigid right tab 22 (shown in FIG. 3 and FIG. 4) to the respective inner surfaces 27 of the left and right inclines 32, 38. In viewing FIG. 4, there is illustrated a depiction of a tab 18, 22 (typical of either a left or right tab 18, 22). The tab 18, 22 is attached to the inner surface 27 of the directly opposed left and right inclines 32, 38, respectively, of each of the bands 5, 5(a), 5(b).

Both the left and/or right tab 18, 22 are identical to each other and comprise essentially an oblong, rigid structure bent at an angle of approximately forty-five degrees. Each tab 18, 22 is further shown having a circular opening 17, 21 in the upper section of each tab 18, 22 and an oval opening 19, 23 in the lower section of the tab 18, 22. A threaded fastener may be used to securely attach each tab 18, 22 to the respective left and right inclines 32, 38 of the first band 5. This is done by insertion of the fastener through the left side aperture 25 and into the left circular hole 17 of the left tab 18. Likewise, the fastener is inserted through the right side aperture 26 and right circular hole 21 of the right tab 22. In the preferred embodiment, the fastener comprises a rivet 24(a) integral to the left/right incline 32, 38 and co-axial with the respective left- and right-side apertures 25, 26.

Figure 3:
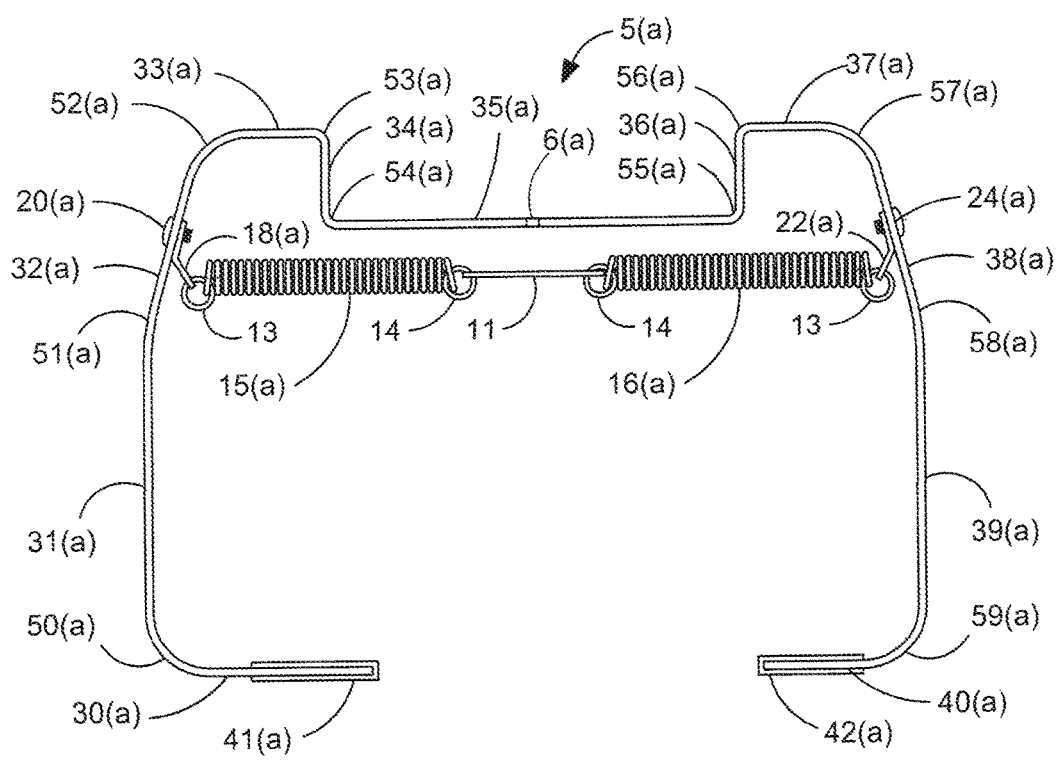
FIG. 3 illustrates a profile view of the second band 5(a), and further showing opposing tension coil springs 15(a), 16(a) as they are attached to the opposite sides of the second band 5(a), in conjunction with a connection to a center junction ring 11.
Figure 4:
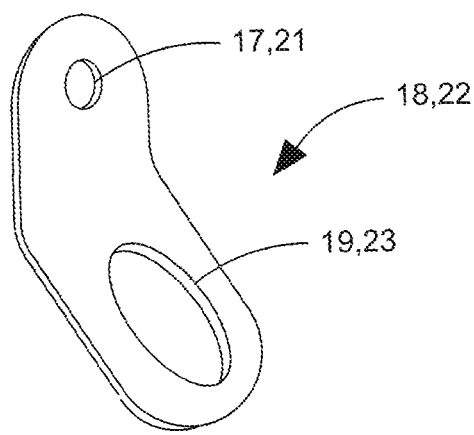
FIG. 4 depicts a left or right tab 18, 22 the tabs utilized for attachment to the inner surface of each of the bands 5, 5(a), 5(b) thereby facilitating the connection of the tension coil springs to the interior of the support grid.

Reference is made to FIG. 3, which depicts the second band 5(a) in its final stage of manufacture/assembly. Two tabs 18(a), 22(a) are secured in place onto their respective left and/or right incline 32(a), 38(a). Shown are a first tension coil spring 15(a), a center closed junction ring 11, and a second tension coil spring 16(a) are linearly joined to provide a linear, tensioned connection of the left tab 18(a) to the right tab 22(a).

Further details of FIG. 3 show that the first tension coil spring 15(a) culminates with a coil inner hook 14 on one end and a coil outer hook 13 on the opposite end. Also shown is an identical second tension coil spring 16(a) with its coil inner hook 14 and a coil outer hook 13. The center closed junction ring 11, which is essentially a closed circular ring, serves as a common connecting point for the inner hook 14 of the first tension coil spring 15(a) and the inner hook 14 of the second tension coil spring 16(a). The outer hook 13 of the first tension coil spring 15(a) and the outer hook 13 of the second tension coil spring 16(a) are connected to the respective left tab 18(a) and right tab 22(a), thereby providing a spring-loaded connection of the left incline 32(a) of the second band 5(a) to its right incline 38(a). In an identical manner, the left side and right side of the first band 5 and the third band 5(b) are provided with the exact spring-loaded connection arrangement.

The accumulative effect of the aligned pairs of tension coil springs 15-16, 15(a)-16(a), and 15(b)-16(b) provide a leveraged, inward-directed force downward to the boots 41-42, 41(a)-42(a), and 41(b)-42(b) of the support grid 1. Therefore, there is a stabilized, friction-enhanced gripping force for the support grid 1 against the generally rounded exterior of an outdoor grill or smoker.

In the preferred embodiment, each band 5, 5(a), 5(b), prior to the bending process, comprises dimensions of approximately 25.0 inches in length, 1.0 inches in width, and 0.125 inch in thickness. The dimensions of the bands 5, 5(a), 5(b) may vary in accordance with the physical characteristics of the particular material used to fabricate the bands 5, 5(a), 5(b). The support grid 1 itself is formed by the permanent fastening of the first band 5, the second band 5(a), and the third band 5b) to each other at overlapping positions corresponding to the center aperture 6 in the top side 35, 35(a), 35(b) of each respective band 5, 5(a), 5(b).

While preferred embodiments of the present inventive concept have been shown and disclosed herein, it will be obvious to those persons skilled in the art that such embodiments are presented by way of example only, and not as a limitation to the scope of the inventive concept. Numerous variations, changes, and substitutions may occur or be suggested to those skilled in the art without departing from the intent, scope, and totality of this inventive concept. Such variations, changes, and substitutions may involve other features which are already known per se and which may be used instead of, in combination with, or in addition to features already disclosed herein. Accordingly, it is intended that this inventive concept be inclusive of such variations, changes, and substitutions, and by no means limited by the scope of the claims presented herein.

What is claimed is:

1. A device for the support of the bottom exterior surface of a container having food items within said container, said device specifically configured and structured for a gripping, flexible, stable placement directly atop, and centered upon, a smokestack commonly found on an outdoor cooking grill or smoker, said device comprising
    a semi-rigid grid assemblage of three primarily longitudinal rectangular-shaped bands, being a first band, a second band, and a third band, each band having a left end and a right end, wherein each band is configured and shaped with a specific sequential series of bends, arcs, and rounds, each such bend, arc, or round oriented transverse to the length dimension of each band, and thereby forming an outer and inner band surface, wherein
    beginning with the left end of each band, there is manifested a horizontally-oriented left foot, followed by a curvilinear upward bend of ninety degrees forming a left heel, said left heel transitioning into a vertically-oriented left leg, which leads to a left mid-bend of approximately ten degrees which forms a left incline, followed by a left inward arc of approximately eighty degrees thereby forming a left flat, transitioning to a left outer round, comprising a downward bend of ninety degrees to thereby form a left brace which is followed by a left inner round of ninety degrees, thereby forming a horizontally-oriented left top surface; further,
    said left top surface extends horizontally into a right top surface, whereby the bends and linear segments previously described occur in the reverse order on the right half of the band, thereby occurring a right inner round bending upward ninety degrees to form a right brace, a right outer round, which forms a right flat, a right inward arc bending at approximately eighty degrees to form a right incline, a right mid-bend which forms a right leg, transitioning to a curvilinear bend of ninety degrees, thereby forming a right heel, which transitions to form a horizontally-oriented right foot; and wherein
    said left top surface and said right top surface of each band form a continuous horizontal surface wherein a center aperture is drilled midway between said left inner round and said right inner round, said center aperture allowing the three bands to be joined by means of a fastener passing through each the first band, the second band, and the third band, binding said bands to each other in a stacked manner, all three bands thereby joined at their respective center apertures; and further,
    said left foot and said right foot of each band are respectively configured with a form-fitting, adhering boot, said boot being a coating of a plastic dip-type substance covering the majority of the exterior surface of each foot.

2. A device for the support of the bottom exterior surface of a container having food items within said container, said device specifically configured and structured for a flexible, gripping placement directly atop, and centered upon, a smokestack commonly found on an outdoor cooking grill or smoker, said device comprising
    a grid assemblage of three primarily longitudinal rectangular-shaped semi-rigid metal bands, being a first band, a second band, and a third band, each band having a left end and a right end, each band comprising dimensions of 25.0 inches length, 1.0 inch width, and 0.125 inch thickness, wherein each band is configured and shaped with a specific sequential series of bends, arcs, and rounds, each such bend, arc, or round oriented transverse to the length dimension of each band, and thereby forming an outer and inner band surface, wherein
    beginning with the left end of each band, there is manifested a horizontally-oriented left foot, followed by a curvilinear upward bend of ninety degrees forming a left heel, said left heel transitioning into a vertically-oriented left leg, which leads to a left mid-bend of approximately ten degrees which forms a left incline, followed by a left inward arc of approximately eighty degrees thereby forming a left flat, transitioning to a left outer round, comprising a downward bend of ninety degrees to thereby form a left brace which is followed by a left inner round of ninety degrees, thereby forming a horizontally-oriented left top surface; further,
    said left top surface extends horizontally into a right top surface, whereby the bends and linear segments previously described occur in the reverse order on the right half of the band, thereby occurring a right inner round bending upward ninety degrees to form a right brace, a right outer round, which forms a right flat, a right inward arc bending at approximately eighty degrees to form a right incline, a right mid-bend which forms a right leg, transitioning to a curvilinear bend of ninety degrees, thereby forming a right heel, which transitions to form a horizontally-oriented right foot; and wherein
    said left top surface and said right top surface of each band form a continuous horizontal surface wherein a center aperture is drilled midway between said left inner round and said right inner round, said center aperture allowing the three bands to be joined by means of a fastener passing through each the first band, the second band, and the third band, binding said bands to each other in a stacked manner, all three bands thereby joined at their respective center apertures; and further,
    said left foot and said right foot of each band are respectively configured with a form-fitting, adhering boot, said boot being a coating of a plastic dip-type substance covering the majority of the exterior surface of each foot.

3. A device as in either claim 1 or claim 2, further comprising
    an aperture, through the left incline, and an aperture through the right incline of each of said bands;
    a rigid tab having a bend of approximately forty-five degrees, creating an upper section and a lower section of said tab, further having a circular hole in said upper section and an oval opening in said lower section;

a rivet permanently attaching, through said circular hole of each tab to each of the respective left and right inclines of each of said three bands;
a first tension coil spring having one end constructed with a coil inner hook and the opposite end constructed with a coil outer hook;
a second tension coil spring constructed identically to said first tension coil spring;
a center closed junction ring, wherein
within the confines of each band, the outer hook of a first tension coil spring and the outer hook of a second tension coil spring are connected to the respective oval opening of each said tab attached to the respective left and right inclines, and said coil inner hook of said first tension coil spring and said coil inner hook of said second tension coil spring are adjoined to said center circular junction, thereby providing a spring-loaded linear connection, within each band, of each of said left inclines to its diametrically opposed right incline.

* * * * *